US006252959B1

United States Patent
Paar et al.

(10) Patent No.: US 6,252,959 B1
(45) Date of Patent: *Jun. 26, 2001

(54) METHOD AND SYSTEM FOR POINT MULTIPLICATION IN ELLIPTIC CURVE CRYPTOSYSTEM

(75) Inventors: Christof Paar, Northampton; Jorge Guajardo, Worcester, both of MA (US)

(73) Assignee: Worcester Polytechnic Institute, Worcester, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/082,037

(22) Filed: May 20, 1998

Related U.S. Application Data (60) Provisional application No. 60/047,289, filed on May 21, 1997.

(51) Int. Cl.[7] .................. H04L 9/28; H04L 9/30
(52) U.S. Cl. .................. 380/28; 380/44; 380/282; 380/30
(58) Field of Search .................. 380/28, 21, 30, 380/44, 282

(56) References Cited

U.S. PATENT DOCUMENTS

| | | | |
|---|---|---|---|
| 5,146,500 | * 9/1992 | Maurer | 380/30 |
| 5,299,262 | 3/1994 | Brickell et al. | 380/28 |
| 5,371,794 | 12/1994 | Diffie et al. | 380/21 |
| 5,442,707 | 8/1995 | Miyaji et al. | 380/30 |
| 5,600,725 | 2/1997 | Rueppel et al. | 380/30 |
| 5,724,279 | * 3/1998 | Benaloh et al. | 364/746 |

OTHER PUBLICATIONS

Montgomery, P.L., "Modular Multiplication Without Trial Division," Mathematics of Computation, vol. 44, No. 170, Apr. 1985, pp. 519–521.*

Kaliski Jr., B.S., "The Montgomery Inverse and Its Applictions," IEEE Trans. on Computers, vol. 44, No. 8, Aug. 1995, pp. 1064–1065.*

Schneier, B., "Applied Cryptography Second Edition: Protocols, Algorithms, and Source Code in C," John Wiley & Sons, Oct. 18, 1995, pp. 185–187.*

T. Itoh, et al., "A Fast Algorithm for Computing Multiplicative Inverses in GF ($2^m$) Using Normal Bases," *Information and Computation* 78, 171–177 (1988).

Cetin Kaya Koc, "Analysis of Sliding Window Techniques for Exponentiation," Dept. of Electrical & Computer Engineering, Oregon State University; *Computers and Mathematics with Applications*, 30(10) :17–24 (1995).

(List continued on next page.)

Primary Examiner—Tod Swann
Assistant Examiner—Justin T. Darrow
(74) Attorney, Agent, or Firm—Hamilton, Brook, Smith & Reynolds, P.C.

(57) ABSTRACT

A point doubling method for elliptic curve cryptosystems is disclosed in which $2^k P = (X_k, y_k)$ is directly calculated from $P=(x,y)$ without computing intermediate points such as 2P, 4P, etc. The advantage in this direct calculation technique is that the number of inversions in the underlying field $GF(2^k)$ is reduced. Although this does not come without a price. In most implementations, the number of multiplications is increased. The present invention is based upon the recognition that for most practical applications, the inversion is by far the most expensive operation to perform of the inversion, multiplication, addition, and squaring in the point doubling operations. As a result, the net time to perform the additional multiplications is less than the time required to perform the inversion, the multiplications effectively replace, thereby yielding in the efficiency of the present invention.

28 Claims, 3 Drawing Sheets-

OTHER PUBLICATIONS

Julio Lopez et al., "An Improvement of the Guajardo–Paar Method for Multiplication on Non–supersingular Elliptic Curves," Technical Report IC–97–O, Institute of Computing, State University of Campinas, Campinas, Sao Paulo, Brazil, Sep. 19, 1997.

Julio Lopez et al., "On Computing a Multiple of a Point on Elliptic Curves," Technical Report IC–98–0, Institute of Computing, State University of Campinas, Campinas, Sao Paulo, Brazil, Dec. 8, 1997.

Julio Lopez et al., "Improved Algorithm for Elliptic Curve Arithmetic in GF($2^n$)," Technical Report IC–98–**, Institute of Computing, State University of Campinas, Campinas, Sao Paulo, Brazil, Draft: May, 1998.

Richard Schroeppel et al., "Fast Key Exchange with Elliptic Curve Systems," Department of Computer Science, University of Arizona. Lecture Notes in Computer Science, 1995, Issue 463, pp. 43–56.

Eric De Win et al., "A Fast Software Implementation for Arithmetic Operations in GF($2^n$)," Katholieke Universiteit Leuven, Heverlee, Belgium, ASIACRYPT, 1996.

Alfred J. Menezes et al., "Handbook of Applied Cryptography," 1997 CRC. Press, Boca Raton, Florida.

Aleksandar Jurisic et al., "Elliptic Curves and Cryptography," Dr. Dobb's Journal, Apr. 1997.

Draft ANSIi X9.63, Public Key Cryptography for the Financial Services Industry: Elliptic Curve Key Agreement and Transport Protocols, Oct. 5, 1997.

* cited by examiner

METHOD AND SYSTEM FOR POINT MULTIPLICATION IN ELLIPTIC CURVE CRYPTOSYSTEM

RELATED APPLICATION(S)

This application claims the benefit of Provisional Patent Application 60/047,289, filed May 21, 1997, by the instant inventors, the entire teachings of this provisional patent application are incorporated herein in their entirety by this reference.

BACKGROUND OF THE INVENTION

Cryptosystems are becoming increasingly important especially as data communication becomes ubiquitous. No longer limited to military applications, cryptosystems are being used commercially for such applications as privacy systems, authentication, and digital signatures. Privacy systems prevent the extraction of information transmitted through or stored in a medium by unauthorized parties. Identification is used, for example, in cellular phone communications to prevent fraudulent access to a customer account. And, digital signature systems are used to verify the authenticity of a message.

One of the most significant contributions to the field of cryptography was made by Diffie-Hellman (DH) with the concept of public key cryptographic systems. The core realization was the fact that practically secure systems can be built that require no secure transfer of any secret key. Previously, it was thought that a secure cryptosystem relied on the prior agreement between the sending and receiving parties concerning the key used to encrypt the data. If the secrecy of this key was ever prejudiced, the secrecy of the cryptosystem was also at risk.

The critical innovation of Diffie-Hellman was the concept of the one-way function. Such a function is defined as a function $f$ such that for every $x$ in the domain of $f$, $f(x)$ is easy to compute; but for virtually all $y$ in the range of $f$, it is computationally infeasible to find an $x$ such that $y=f(x)$. Also discovered was the concept of the trapdoor one-way function. These functions are defined as a family of invertible functions $f_z$ indexed by $z$, such that, given $z$, it is easy to find algorithms $E_z$ and $D_z$ that easily compute $f_z(x)$ and $f_z^{-1}(y)$ for all $x$ and $y$ in the domain and range, respectively, of $f_z$. It is computationally infeasible to compute $f_z^{-1}(y)$ even assuming $E_z$ is known, if $z$ is not known.

RSA is considered to be the first usable public key cryptosystem. This particular cryptosystem is based on the difficulty of factoring very large numbers, and today, it is still the most widely used public-key cryptosystem in the world. Since then, in the field of computational number theory, major work has been done towards efficient integer factorization. As a consequence, new types of public-key algorithms have arisen. The most important competitors to RSA are schemes based on the Discrete Logarithm (DL) problem. Originally, the DL problem was considered in the multiplicative group of a finite field, especially a prime field or a field of characteristic 2, since these fields seemed most appropriate for implementations. Then in 1985, a variant of the DL problem was proposed based on the group of points of an elliptic curve (EC) over a finite field.

A main feature that makes elliptic curves attractive is the relatively short operand length. Cryptosystems that explore the DL problem over elliptic curves can be built with an operand length of 140–200 bits as compared to RSA and systems based on the DL in finite fields, both of which require operands of 512–1024 bits. Other advantages are the large numbers of curves that are available to provide the groups and the absence of sub-exponential time algorithms (such as the index calculus method) to attack EC cryptosystems. The latter property provides a very good long-term security against current attacks. In addition, IEEE and other standard bodies such as ANSI and ISO are in the process of standardizing EC cryptosystems.

SUMMARY OF THE INVENTION

One of the main problems associated with the deployment of EC cryptosystems is the fact that their implementation is computationally intensive. This slows the single isolated transfer by a given user. Moreover, in anticipated commercial systems where there are substantial real-time transaction processing throughput requirements, computational efficiency becomes a major issue and cost factor in the systems. In short, it is important for a system, with limited processing capabilities, to process as many transactions as possible.

When implementing an elliptic curve cryptosystem, one is required to compute:

$$eP = \underbrace{P + P \ldots + P}_{e \text{ times}},$$

where $e$ is a positive integer and $P$ is a point on the elliptic curve. In the initial phase of the DH protocol, applied to elliptic curve systems, both parties agree on a primitive element $P_0$. Then, they generate or select their secret keys $\{d, r\}$ which are integers and compute their public keys $Q = dP_0$ and $Z = rP_0$, both points on the elliptic curve. In the second phase of the DH protocol, one is required to compute a multiple of a point $P$ (the public key of the other party, e.g., Q,Z) not known ahead of time. The efficient and fast computation of $eP$, where $e$ is a large integer and $P$ is a point on the elliptic curve, is crucial to the speed of the key exchange and digital signature generation.

For very large values of $e$, a straightforward summation becomes impractical and so a method, which is analogous to the square and multiply algorithm for exponentiation, is used. This method is known as "repeated double and add." On the average, for a random 155-bit multiplier, one is required to perform 154 doubling steps and 77 additions.

In the elliptic curve $y^2+xy=x^3+ax^2+c$, $a, c \in GF(2^k)$, the doubling of two points will require one inverse, two multiplications, five additions, and two squarings in the underlying Galois Field $GF(2^k)$. This is a very expensive computational task because of the number of doublings that are required, and because both inversion and multiplication in the underlying field are computationally intensive.

The present invention is based upon the recognition that for most practical applications, the inversion in the underlying Galois Field is by far the most expensive operation to perform of the inverse, multiplication, addition, and squaring in the point doubling operations.

The present invention is directed to a point doubling method for elliptic curve cryptosystems in which $2^k P = (x_k, y_k)$, where $k = 2, 3, 4, \ldots$, i.e., a repeated doubling, is directly calculated from $P = (x, y)$ without computing intermediate points such as $2P$ and $4P$ to compute $2^3 P = 8P$. The advantage in this direct calculation technique is that the number of inversions can be reduced by implementing the principles of the invention. Although this does not come without a price. In most implementations, the number of multiplications is increased. The net time to perform the additional multiplications, however, is less than the time required to perform the inversion, which the multiplications effectively replace, thereby resulting in the efficiency of the present invention. Thus, in the case of the single isolated transaction, it occurs faster, and in the case of the commercial systems, handling many transactions, the real-time transaction processing capabilities are increased.

In general, according to one aspect, the invention features a method for key generation in an elliptic curve cryptosystem. The method comprises acquiring a point P on predetermined elliptic curve and obtaining a new point Q=nP, n is an interger, on the EC. While performing the "point multiplication" (nP), the number of inversions is reduced to expedite the process of determining the new point, which then can be used as a cyptographic key for both signature and encryption processes.

In specific embodiments, the number of inversions is reduced, preferably to a single inversion, at the expense of increasing the multiplications required for the point multiplication. The original point may be acquired as a system parameter in the cryptosystem or a public key of a user of the cryptosystem.

According to the invention, computing the multiple of a point comprises directly computing one or more repeated doublings of the point. As a result, 4P for example is directly computed, rather than first computing 2P and then doubling 2P to 4P, as is conventional.

In general, according to another aspect, the invention also features an elliptic curve cryptosystem. This system comprises a communication subsystem that acquires a point on predetermined elliptic curve and a public key of a receiving party. A compute subsystem then multiplies the point by an integer to obtain a new point on the elliptic curve using a reduction in the number of inversions to expedite the calculation of the new point and that uses the new point as a cyptographic key in transmissions to the receiving party.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
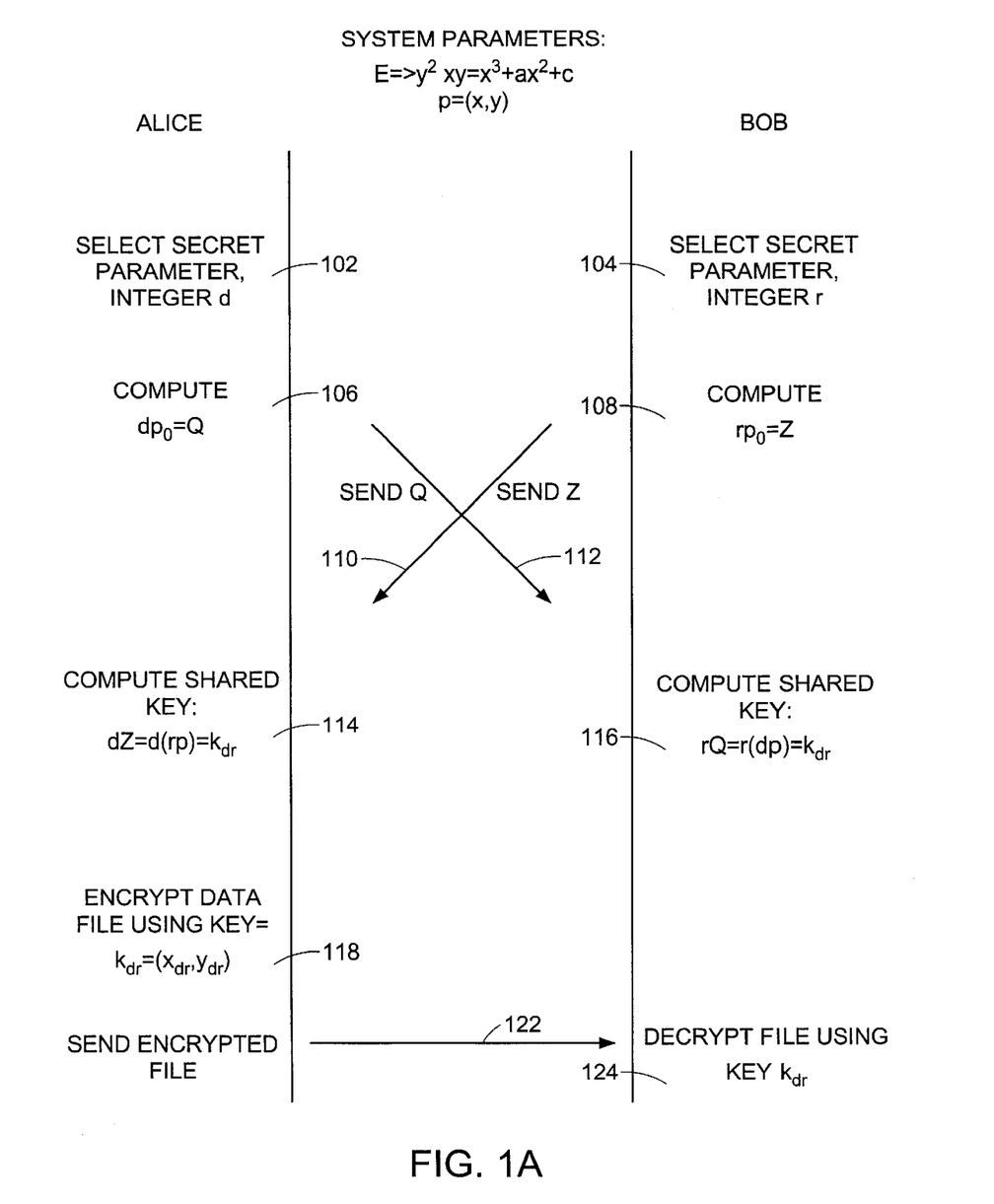
FIGS. 1A and 1B are process, data interaction diagrams illustrating an elliptic curve cryptosystem, to which the present invention is applied.

FIG. 1A shows an elliptic curve cryptosystem, operating between two users, Alice and Bob. System parameters are first defined. In some implementations, these are established as part of an IEEE or other standard protocol. The system parameters include an elliptic curve E, which is defined over a finite field $GF(2^k)$. Preferably, the elliptic curve is a non-supersingular elliptic curve of the form $E \rightarrow y^2 + xy = x^3 + ax^2 + c$, although the same problem can be defined for curves over a finite field GF(p), where p is prime. A point $P_0 = (x,y)$ of order n is also selected. Typically, these are part of the standard and all publically available.

Now assume that Alice, from FIG. 1A, and Bob wish to have a secure file transfer. Both parties first select, independently, a secret integer. In the specific example, Alice has selected integer d and Bob has selected integer r in steps 102, 104. Both parties then compute a point on the elliptic curve E based upon their secret integer and public point $P_0$. In the example, Alice computes $dP_0 = Q$, and Bob computes $rP_0 = Z$ in steps 106, 108. Alice's public key is Q and Bob's public key is Z, and Alice's private key is integer d and Bob's private key is integer r. Alice and Bob then make their public keys publicly available and/or available to each other in steps 110, 112.

To perform the encryption process, Alice obtains Bob's public key, Z. She then computes the shared key, which is not public, but will be common to both Alice and Bob. Specifically, Alice computes $K_{dr} = dZ$ in step 114. Similarly, Bob computes the same shared key according to the equation $K_{dr} = rQ$ in step 116.

$$K_{dr} = dZ = drP_0 = rQ = rdP_0$$

Now Alice encrypts the data file using the common key $K_{dr}$ in step 118 and sends the file in step 122. Bob, receiving the encrypted file, decrypts it using the same key in step 124.

Figure 1B:
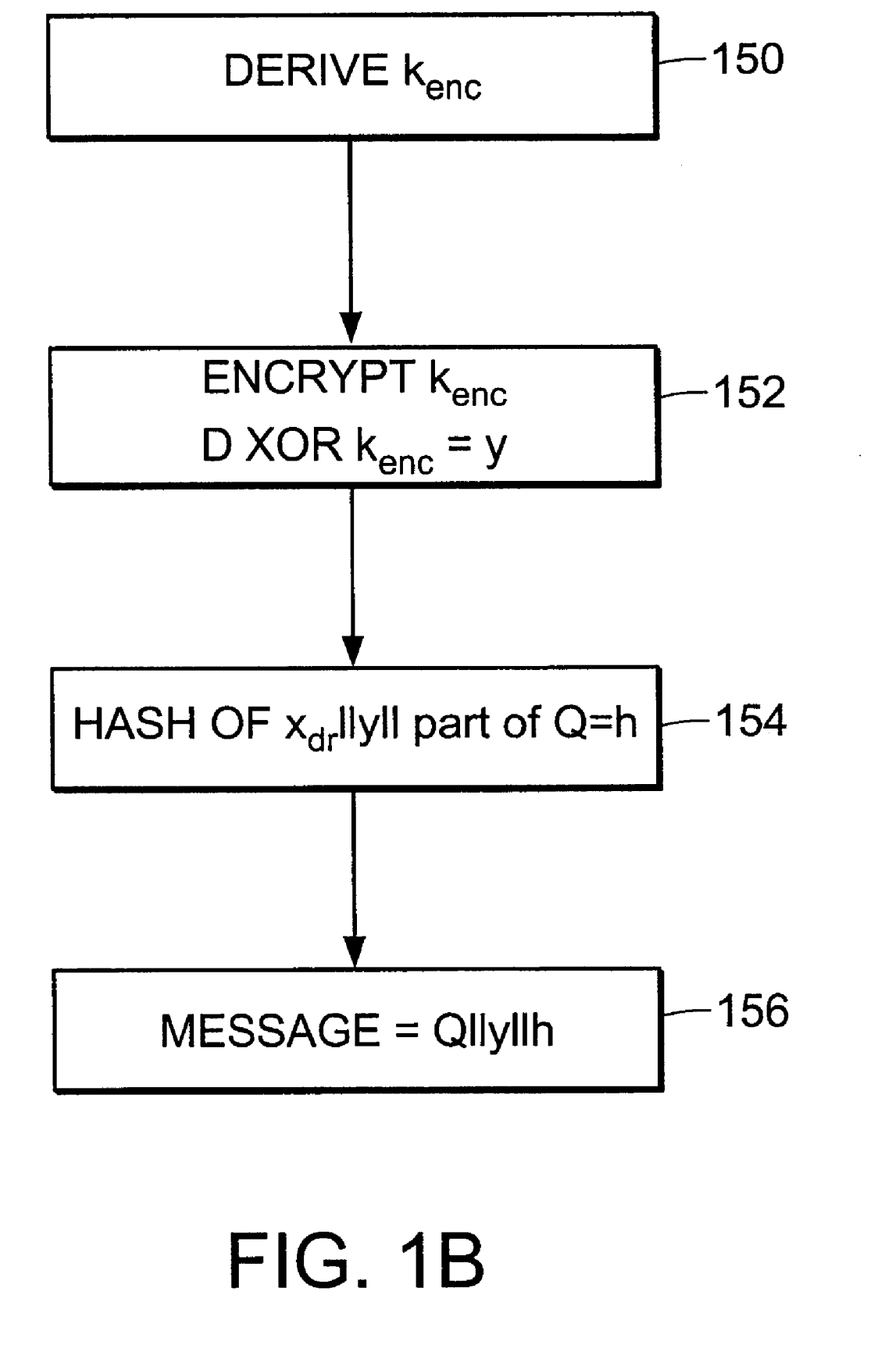

FIG. 1B shows the encryption process used by Alice. This process is based on a draft of the ANSI Standard X9.63, "Public Key Cyrptography for the Financial Services Industry: Elliptic Curve Agreement and Transport Protocols", Oct. 5, 1997. Briefly, Alice derives a new key, $K_{enc}$ in step 150. This new key is a bitstring as long as the length of the data file (never greater than $160(2^{32}$ bits). If the data length is greater than this number, then divide data into block of this length. It is generated by applying a hash function to $X_{dr}$, a counter, and Q, where: $K_{dr} = (X_{dr}, Y_{dr})$. The data of the file, D, is then XORed with $K_{enc}$ to produce the encrypted data, y, in step 152. Next, a hash is computed for $X_{dr}$, y, and Q, in step 154. These resulting bits are then concatenated and set equal to h. The message that is then transmitted to Bob is a concatenation of Q, y, and h, in step 156.

Security is gained by the intractability of finding point $K_{dr}$. Notice that without solving the elliptic curve discrete algorithm problem, which is defined as given: P, Q∈E such that: Q=nP, where n is an integer.

determine: n:

There seems to be no efficient way to compute $K_{dr}$ knowing only Q and Z. Thus, the system is said to be secure.

The problem with the above-described elliptic curve system, however, is the computational resources required by both Alice and Bob to compute $dP_0 = Q$, $rP_0 = Z$, during the precompute stage, and then to calculate the shared key. Alice must compute dZ, and Bob must compute rQ.

The problem of multiplying a point P of an EC by a large integer k is analogous to exponentiation of an element in a multiplicative group to the kth power. The standard algorithm for this problem is the binary exponentiation method (or square-and-multiply algorithm). A generalization of the binary method is the k-ary method, which processes k exponent bits in one iteration. The following is the algorithm as it is applied to elliptic curves:

Theorem 1. Let P∈E and d= $(e_t e_{t-1} \ldots e_1 e_0)_b$ be the radix representation of the multiplier d in base b where $b = 2^k$ for $k \geq 1$. Then Q=dP can be computed using the following algorithm.

Algorithm (Input: P= (x,y),d; Output: Q=dP)

1. Precomputation
   1.1 $P_0 \leftarrow O$ (point at infinity)
   1.2 For i=1 to $2^k-1$
       $P_i = P_{i-1}+P$ (i.e., $P_i = i*P$)
2. $Q \leftarrow O$
3. For i=t to 0
   3.1 $Q \leftarrow 2^k Q$
   3.2 $Q \leftarrow Q+P_{ei}$
4. Return (Q)

Notice that Step 1 in the algorithm involves the doubling of point Q, k times, and Step 2 requires one point addition. Thus, the complexity of the k-ary method with t iterations is kt point doublings, t point additions from the loop in Step 3, and $2^k-2$ point additions from the precomputation in Step 2 (One should not count the first addition in Step 2 since P is added to the point at infinity).

Further improvements of the k-ary method include the improved k-ary method and the sliding window method. Theorems 2 and 3 describe these algorithms.

Theorem 2. Let P∈E and d= $(e_t e_{t-1} \ldots e_1 e_0)_b$ be the radix representation of the multiplier d in base b where $b=2^k$ for $k \geq 1$. Also, for each i such that $0 \leq i \leq t$, if $e_i \neq 0$, then write $e_i = 2^{h_i} u_i$ where $u_i$ is odd; if $e_i = 0$ then let $h_i = 0$, $u_i = 0$. Then, Q=dP can be computed using the following algorithm.

Algorithm (Input: P= (x,y),d; Output: Q=dP)

1. Precomputation
   1.1 $P_0 \leftarrow O$ (point at infinity)
   1.2 $P_1 \leftarrow P$
   1.3 $P_2 \leftarrow 2P$
   1.4 For i=1 to $2^{k-1}-1$
       $P_{2i+1} = P_{2i-1} + P_2$
2. $Q \leftarrow O$
3. For i=t to 0
   $Q \leftarrow 2^{h_i} (2^{k-h_i} Q + P_{u_i})$
4. Return (Q)

Theorem 3. Let P∈E and d= $(e_t e_{t-1} \ldots e_1 e_0)_2$ be the binary representation of the multiplier d together with an integer $k \geq 1$ (window size). The Q=dP can be computed using the following algorithm.

Algorithm (Input: P= (x,y),d; Output: Q=dP)

1. Precomputation
   1.1 $P_1 \leftarrow P$ (point at infinity)
   1.2 $P_2 \leftarrow 2P$
   1.3 For i=1 to $2^{k-1}-1$
       $p_{2i+1} = p_{2i-1}+P_2$
2. $Q \leftarrow O$ (point at infinity)
3. $i \leftarrow t$
4. While $i \geq 0$ do
   4.1 If $e_i = 0$ then
       4.1.1 $Q \leftarrow 2Q$
       4.1.2 $i \leftarrow i-1$
   4.2 Else, find the longest bit-string $e_i e_j \ldots e_1$ such that $i-1+1 \leq k$ and $e_1=1$, and do the following
       4.2.1 $A \leftarrow 2^{i-1+1} A + P_{(e_i e_{i-1} \ldots e_1)2}$
       4.2.2 $i \leftarrow 1-1$
5. Return (Q)

In summary, the algorithms of Theorems 1–3 each rely on successive point doublings and additions. For example, 1P, 2P, 3P are precalculated, then 3P can be used to generate 6P by point doubling, then 6P can be used to generate 12P by a successive point doubling, and so on.

In an elliptic curve E, defined to be the set of points (x,y) with coordinates x and y lying in the Galois field GF $(2^k)$ and satisfying the following cubic equation:

$$y^2 + xy = x^3 + ax^2 + c,$$

where a, c∈GF$(2^k)$, c≠0, together with the point at infinity O, the points (x,y) form an abelian group A doubling of point P, 2P=$(x_1, y_1)$ is achieved by $$x_1 = \left(x + \frac{y}{x}\right)^2 + \left(x + \frac{y}{x}\right) + a \qquad (1)$$

$$y_1 = x^2 + \left(x + \frac{y}{x}\right)x_1 + x \qquad (2)$$

From the addition formulae it can be seen that the doubling of two points in E will require one inverse, two multiplications, five additions, and two squarings in the underlying field GF$(2^k)$. In most practical applications, inversion is by far the most expensive operation to perform.

The present invention is based on the following principle. First observe that the k-ary method relies on k repeated doublings. The new approach allows computation of $2^k P = (x_k, y_k)$ directly from P= (x,y) without computing the intermediate points 2P, $2^2 P$, ..., $2^{k-P}$. Such direct formulae are obtained by inserting Equations (2) and (3) into one another. $4P = 2^2 P = (x_2, y_2)$ is found by inserting the formulae for doubling P= (x,y) into themselves. Thus, we obtain $$x_2 = \frac{\zeta^2 + (\delta\gamma)\zeta}{(\delta\gamma)^2} + a \qquad (3)$$

$$y_2 = \frac{\zeta(\delta\gamma) \cong + (\delta^2)^2}{(\delta\gamma)} + x_2 \qquad (4)$$

where $\gamma = x^2$, $\eta = \gamma + y$, $\delta = \eta^2 + \eta x + a\gamma$, $\xi = \eta x \gamma$, and $\zeta = \delta(\delta + \xi) + \gamma^2 \gamma$.

Notice that Equations (3) and (4) demonstrate that the repeated doubling $2^2 P = (x_2, y_2)$ is directly computed with one inverse, nine multiplications, ten additions and six squarings. The advantage of Equations (3) and (4) is that they only require one inversion as opposed to the two inversions that two separate double operations would require for computing 4P. The "price" that must be paid is 9−4=5 extra multiplications if squarings and additions are ignored. For k=2, the direct formulae (3) and (4) trade thus one inversion at the cost of 5 multiplications. It is easy to see that the formulae are an advantage in situations where multiplication is at least five times as costly as inversion. However, this "break even point" decreases if the method is extended to the computation of $2^k P$ for k>2 as described below.

Expressions are provided for $2^3 P = (x_3, y_3)$, $2^4 P = (x_4, y_4)$, $2^5 P = (x_5, y_5)$, and $2^6 P = (x_6, y_6)$, and $2^7 P = (x_7, y_7)$.

Given a point P= (x,y) on the elliptic curve E one can compute the point $Q = 2^3 P = (x_3, y_3)$ with 1 inverse, 14 multiplications, 11 squarings, and 15 additions as shown in (5) and (6).

$$x_3 = \frac{\omega^2 + \omega\rho}{\rho^2} + a \qquad (5)$$

$$y_3 = \frac{(v^2)^2 + \omega\rho x_3}{\rho^2} + x_3 \qquad (6)$$

Given a point P= (x,y) on the elliptic curve E one can compute the point $Q = 2^4 P = (x_4, y_4)$ with 1 inverse, 19 multiplications, 15 squarings, and 20 additions as shown in (7) and (8).

$$x_4 = \frac{\theta^2 + \theta\mu\rho^2}{(\mu\rho^2)^2} + a \qquad (7)$$

$$y_4 = \frac{(\mu^2)^2 + (\theta\mu\rho^2)x_4}{(\mu\rho^2)^2} + x_4 \qquad (8)$$

Given a point P= (x,y) on the elliptic curve E one can compute the point $Q=2^5P= (x_5,y_5)$ with 1 inverse, 24 multiplications, 19 squarings, and 25 additions as shown in (9) and (10).

$$x_5 = \frac{\sigma^2 + \sigma\beta\kappa^2}{(\beta\kappa^2)^2} + a \qquad (9)$$

$$y_5 = \frac{(\beta^2)^2 + x_5(\sigma\beta\kappa^2)}{(\beta\kappa^2)^2} + x_5 \qquad (10)$$

Given a point P= (x,y) on the elliptic curve E one can compute the point $Q=2^6P= (x_6,y_6)$ with 1 inverse, 29 multiplications, 23 squarings, and 30 additions as shown in (11) and (12).

$$x_2 = \frac{\alpha^2 + \alpha\lambda^2\pi}{(\pi\lambda^2)^2} + a \qquad (11)$$

$$y_6 = \frac{(\pi^2)^2 + x_6(\alpha\lambda^2\pi)}{(\alpha\lambda^2)^2} + x_6 \qquad (12)$$

Given a point P= (x,y) on the elliptic curve E one can compute the point $Q=2^7P= (x_7,y_7)$ with 1 inverse, 34 multiplications, 27 squarings, and 35 additions as shown in (13) and (14).

$$x_7 = \frac{\psi^2 + \psi^2\epsilon}{(\epsilon\chi^2)^2} + a \qquad (13)$$

$$y_7 = \frac{(\epsilon^2)^2 + x_7(\psi\chi^2\epsilon)}{(\epsilon\chi^2)^2} + x_7 \qquad (14)$$

where $\gamma, \eta, \delta, \xi$, and $\zeta$ are as defined relative to equations 3 an 4, and $\tau=\delta_\gamma$, $\nu=\zeta^2+\tau\zeta+\tau^2a$, $\rho=\nu\tau^2$, $\omega=\nu(\nu+\zeta\tau)+\tau\delta^2)^2+\rho$, $\mu=\omega^2+\omega\rho+a\rho^2$, $\theta=\mu^2+\mu(\omega\rho)+\mu\rho^2+(\nu^2\rho)^2$, $\kappa=\mu\rho^2$, $\beta=\theta^2+\theta k+ ak^2$, $\sigma=\beta(\beta+\theta k+k^2)+k^2(\mu^2)^2$, $\lambda=\beta k^2$, $\Pi=\sigma^2+\sigma\lambda+a\lambda^2\chi=\Pi\lambda^2$, $\alpha=(\beta^2\lambda)^2+\Pi^2+\Pi\sigma\lambda+\chi$, $\epsilon=\alpha^2+\alpha\chi+a\chi^2$, and $\psi=\epsilon^2+(\chi\Pi^2)+\alpha\chi\epsilon+\chi^2\epsilon$.

Again, these expressions only require one inversion as opposed to the three or four inversions that the regular double and add algorithm would require in each one of these cases. It is important to point out that the point P has to be an element of prime order belonging to the cyclic subgroup corresponding to the largest prime factor in the order of E. This last requirement ensures that 4P, 8P, or 16P will never equal 0.

For application in practice, it is highly relevant to compare the complexity of the derived formulae with that of the double and add algorithm. Noting that the inventive method reduces inversions at the cost of multiplications, the performance of the new method depends on the cost factor of one inversion relative to the cost of one multiplication. For this purpose we introduce the notion of a "break even point." Since it is possible to express the time that it takes to perform one inversion in terms of the equivalent number of multiplication times, we define the break even point as the number of multiplication times needed per inversion so that our formulae outperform the regular double and add algorithm. The results are summarized in Table 1.

TABLE 1

Complexity comparison: individual doublings vs. direct computation of several doublings.

| Calculation | Method | Squarings | Additions | Multiplications | Inversion | Break Even Point |
|---|---|---|---|---|---|---|
| 4P | Direct Doublings | 7 | 10 | 9 | 1 | 1 inv. > 5 mult. |
|  | Indiv. Doublings | 4 | 10 | 4 | 2 | |
| 8P | Direct Doublings | 11 | 15 | 14 | 1 | 1 inv. > 4 mult. |
|  | Indiv. Doublings | 6 | 15 | 6 | 3 | |
| 16P | Direct Doublings | 15 | 20 | 19 | 1 | 1 inv. > 3.7 mult. |
|  | Indiv. Doublings | 8 | 20 | 8 | 4 | |

The repeated doubling derived formulae are independent of the base representation of the elements of the underlying field of the elliptic curve. Thus, they can not only be applied to polynomial base representation of field elements but also to normal base and dual base representations. Further, it is important to point out that the approach can be extended to formulae that compute more than 5 repeated elliptic curve point doublings.

Notice that similar formulae can be derived for elliptic curves over fields of characteristic 3, fields of characteristic larger than 3, and other finite fields, i.e., finite fields of the form $GF_{(p)}$ where p is a prime.

Finally, the formulae are not restricted to be used in conjunction with the k-ary method and improved k-ary method of exponentiation but rather they can be used with any window method of exponentiation.

Figure 2:
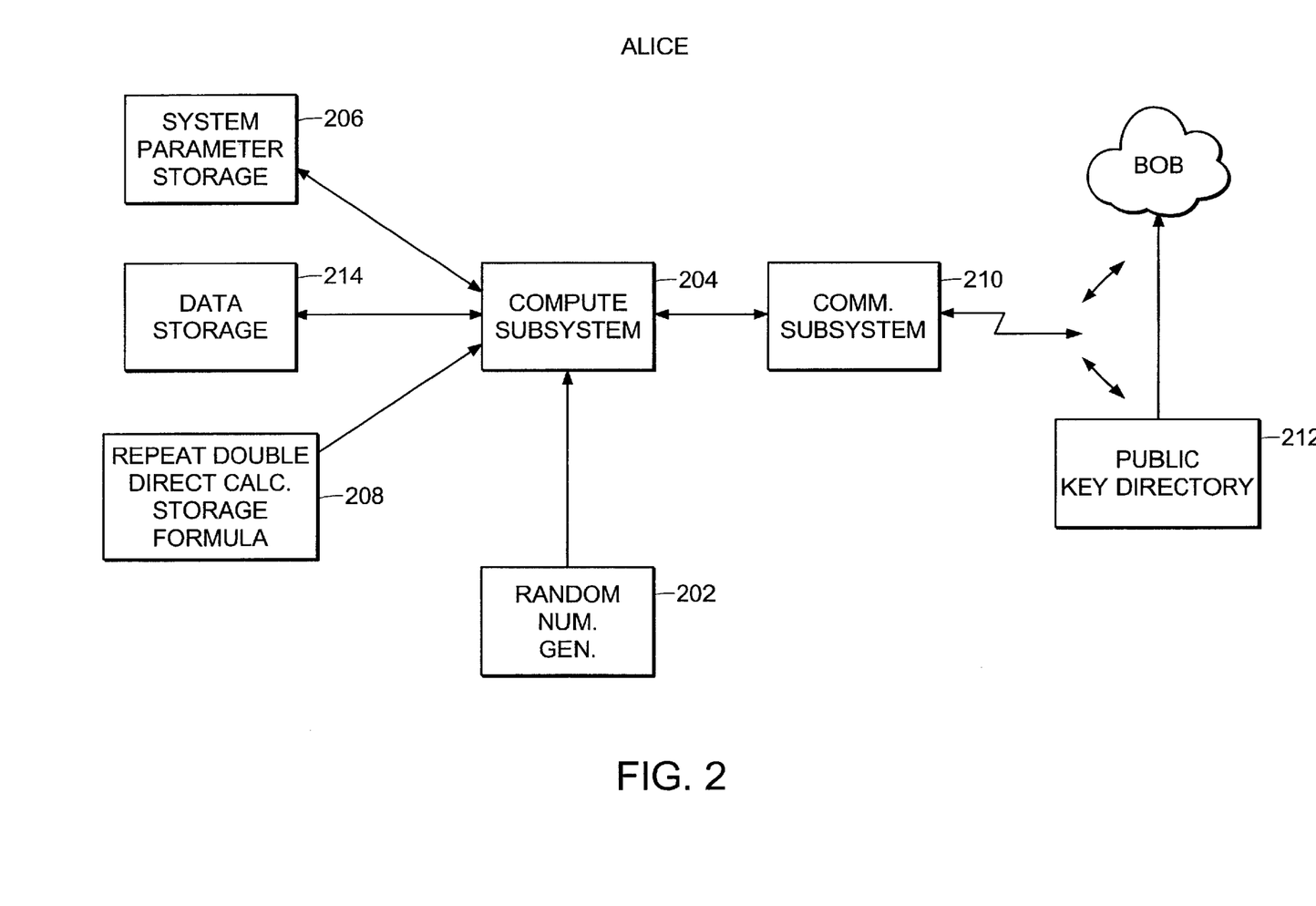
FIG. 2 is a block diagram computer system implementing an EC cryptosystem according to the invention.

Returning to the drawings, FIG. 2 shows generalized system such as that operated by Alice, from FIGS. 1A and 1B, in which the present invention is used.

First, Alice must generate her secret parameter d. This requires random number generation. In the illustrated example, a random number generator 202 provides a random variable to compute subsystem 204. The compute subsystem 204 uses integer d to compute $Q=dP_0$, Alice's public key. This is accomplished by accessing system parameter storage 206 and retrieving $P_0$ and E, which is used as a system parameter for the EC system. Generally, these system parameters are accessible in the public directory 212.

For the compute subsystem 204 to multiply $dP_0$, it first determines what repeated doublings of P are needed to optimally calculate Q. For this process, the k-ary method, improved k-ary method, and the sliding window method are applicable, since d is much larger, typically on the order of hundreds of binary bits, $2^{100}$.

The following shows the variable assignments, precomputation and computation phases of the K-ary theorem, Theorem 1 herein, for d=25. Table II shows the tabulated results for iterations i=2, i=1, i=0.

n=25=01 10 01$_2$=1 2 1$_{4 \leftarrow b=4=22 \rightarrow K=2}$ $e_e\ e_1\ e_0$ n=$(e_e e_1 e_0)_b$= (1 2 1)$_4$; t=2

1. Precomputation
   1.1 $P_0$=0
   1.2 For i=1 to $2^k$-1=4-1=3
       $P_i=P_{i-1}+P$
       →$P_1$=P $P_2$=2P $P_3$=3P 2. Q 0
3. For i=t=2 to 0
3.1 $Q \leftarrow 2^k Q$
3.2 $Q \leftarrow Q + P_{ei}$

TABLE II

| i | Q (Before 3.1) | Q (After 3.1) | Q (After 3.2) | $P_{ei}$ |
|---|---|---|---|---|
| 2 | O | $Q = 2^2 Q = 2^2 O = O$ | $Q = O + P_{e2}$ $Q = O + P = P$ | $P_{e2} = P_1 = P$ |
| 1 | P | $Q = 2^2 Q = 2^2 P = 4P$ | $Q = 4P + P_{e1}$ $Q = 4P + P_2 =$ $4P + 2P = 6P$ | $P_{e1} = P_2$ $P_z = 2P$ |
| 0 | 6P | $Q = 2^2 Q = 2^2 (6)P = 24P$ | $Q = 24P + P_{e0}$ $Q = 24P + P = 25P$ | $P_{e0} = P1$ $P_{1} = P$ |

In the simple example illustrated, k=2 formula is accessed. The compute subsystem 204 then directly calculates $2^2 P_0 = 4P_0$ and it adds to this intermediate result $2P_0$, which had been computed in the precomputation operation, to obtain $6P_0$. This is fed again into subsystem 204 to obtain $2^2 (6 P_0) = 24P_0$, and finally, it adds $24P_0 + P_0 = 25P_0 = Q$, thus obtaining the desired result. In these operations, the compute subsystem 204 accesses repeated double direct calculation formulae storage 208. This storage holds equations that allow the calculation of $2^k P$ repeated doublings directly.

The compute subsystem, having calculated Q, then makes it available to Bob. In the typical example, the public key Q is posted on a public key directory 212 via the communications subsystem 210.

When Alice and Bob agree to transfer data, Alice's compute subsystem 204 accesses Bob's public key Z via the communications subsystem 210 to the public key directory 212. The compute subsystem 204 upon receiving Z, calculates $K_{dr} = dZ$. As in the calculation of Q, the compute subsystem again first determines what direct doublings of Z needed in order to create a summation of d, and then access the repeat double direct calculation formulae storage 208 to enable the compute subsystem to directly calculate the repeated doublings of the point. The compute subsystem 204 then calculates these repeat doublings of the point and then generates the summation of those repeated doublings.

In the preferred embodiment, the repeat double direct calculation formulae are those disclosed in the previously described theorems, which minimize the number of inversions in the calculation. As a result, the compute subsystem 204, which, as is typical with these subsystems, performs inversions more slowly than multiplications, performs the point calculation more quickly.

When the key $K_{dr}$ is calculated, the compute subsystem 204 accesses the file to be encrypted in data storage 214. The compute subsystem 204 then encrypts the file using the common key $K_{dr}$. The encrypted files are then transmitted by the communication subsystem 210 to Bob who has similarly calculated the shared key.

While this invention has been particularly shown and described with references to preferred embodiments thereof, it will be understood by those skilled in the art that various changes in form and details may be made therein without departing from the spirit and scope of the invention as defined by the appended claims. For example, those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method for key generation in an elliptic curve cryptosystem, the method comprising:
   acquiring a point on predetermined elliptic curve;
   multiplying the point by an integer to obtain a new point on the elliptic curve;
   while performing the point multiplication, reducing the number of inversions to expedite the process of determining the new point; and
   using the new point to produce a cyptographic key.

2. A method as described in claim 1, wherein the step of reducing the number of inversions comprises reducing the number of inversions at an expense of increasing the multiplications required for the point multiplication.

3. A method as described in claim 2, wherein reducing the number of inversions comprises reducing the inversions to a single inversion in the computation for point multiplication.

4. A method as described in claim 1, wherein the step of acquiring the point comprises receiving the point as a system parameter in the cryptosystem.

5. A method as described in claim 1, wherein the step of acquiring the point comprises retrieving a public key of a user of the cryptosystem.

6. A method as described in claim 1, wherein the step of computing the multiple of a point comprises directly computing one or more repeated doublings of the point.

7. A method as described in claim 6, wherein directly computing the repeated doubling of the point comprises computing $2^k P$, wherein P is the point, and k is the number of point doublings.

8. A method as described in claim 7, wherein k is any one of k=2, 3, 4, 5, 6, 7, or more.

9. A method as described in claim 6, wherein reducing the number of inversions comprises exchanging inversions in the direct computation of a repeated doubling of the point.

10. A method as described in claim 6, wherein reducing the number of inversions comprises reducing the inversions to a single inversion in the direct computation of a repeated doubling of the point.

11. A method as described in claim 1, wherein the new point is transmitted as a public key.

12. A method as described in claim 1, wherein the new point is used as a common key.

13. An elliptic curve cryptosystem, comprising:
   a communication subsystem that acquires a point on predetermined elliptic curve and a public key of a receiving party; and
   a compute subsystem that multiplies the point by an integer to obtain a new point on the elliptic curve using a reduction in the number of inversions to expedite the calculation of the new point and that uses the new point to produce a cyptographic key in transmissions to the receiving party.

14. An elliptic curve cryptosystem as described in claim 13, wherein the compute subsystem reduces the number of inversions at an expense of increasing the multiplications required for the point multiplication.

15. An elliptic curve cryptosystem as described in claim 14, wherein the compute subsystem reduces the inversions to a single inversion in the direct computation of a repeated doubling of the point.

16. An elliptic curve cryptosystem as described in claim 13, wherein the communication subsystem acquires the point from a public key directory for the receiving party.

17. An elliptic curve cryptosystem as described in claim 13, wherein the compute subsystem directly computes a repeated doubling of the point.

18. An elliptic curve cryptosystem as described in claim 13, wherein compute subsystem directly computes $2^kP$, wherein P is the point, and k is the number of point doublings.

19. An elliptic curve cryptosystem as described in claim 18, wherein k, the number of point doublings, is any one of k=2, 3, 4, 5 or more.

20. An elliptic curve cryptosystem as described in claim 17, wherein the compute subsystem reduces the number of inversions at an expense of increasing the multiplications in the direct calculation of the repeated doubling of the point.

21. An elliptic curve cryptosystem as described in claim 20, wherein the compute subsystem reduces the inversions to a single inversion in the direct calculation of the repeated doubling of the point.

22. An elliptic curve cryptosystem as described in claim 13, wherein the new point is used as a common key with the receiving party.

23. A method for key generation in an elliptic curve cryptosystem, the method comprising:

acquiring a point on a predetermined elliptic curve;

multiplying the point in an underlying Galois field by an integer to obtain a new point on the elliptic curve;

while performing the point multiplication, reducing the number of inversions in an underlying Galois field to expedite the process of determining the new point; and using the new point to produce a cyptographic key.

24. A method as described in claim 23, wherein the step of reducing the number of inversions comprises reducing the number of inversions in an underlying Galois field at an expense of increasing the multiplications in an underlying Galois field required for the point multiplication.

25. A method as described in claim 24, wherein reducing the number of inversions comprises reducing the inversions to a single inversion in the computation for point multiplication.

26. An elliptic curve cryptosystem, comprising:

a communication subsystem that acquires a point on a predetermined elliptic curve and a public key of a receiving party; and a compute subsystem that multiplies the point by an integer to obtain a new point on the elliptic curve using a reduction in the number of inversions in an underlying Galois field to expedite the calculation of the new point and that uses the new point to produce a cyptographic key in transmissions to the receiving party.

27. An elliptic curve cryptosystem as described in claim 26, wherein the compute subsystem reduces the number of inversions in an underlying Galois field at an expense of increasing the multiplications in an underlying Galois field required for the point multiplication.

28. An elliptic curve cryptosystem as described in claim 27, wherein the compute subsystem reduces the inversions to a single inversion in the direct computation of a repeated doubling of the point.

\* \* \* \* \*